United States Patent
Talaski

(10) Patent No.: US 8,933,609 B2
(45) Date of Patent: Jan. 13, 2015

(54) ELECTRIC MOTOR DRIVEN LIQUID PUMP AND BRUSH FOR SAME

(75) Inventor: Edward J. Talaski, Caro, MI (US)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 260 days.

(21) Appl. No.: 13/585,222

(22) Filed: Aug. 14, 2012

(65) Prior Publication Data
US 2013/0049524 A1 Feb. 28, 2013

Related U.S. Application Data

(60) Provisional application No. 61/526,416, filed on Aug. 23, 2011.

(51) Int. Cl.
| H02K 13/00 | (2006.01) |
|---|---|
| H01R 39/40 | (2006.01) |
| H01R 39/38 | (2006.01) |
| F04B 17/03 | (2006.01) |

(52) U.S. Cl.
CPC .............. *H01R 39/40* (2013.01); *H01R 39/381* (2013.01); *F04B 17/03* (2013.01); *H01R 2201/26* (2013.01)
USPC .......................................... 310/242; 310/248

(58) Field of Classification Search
USPC ................. 310/238, 239, 242, 248
See application file for complete search history.

(56) References Cited

U.S. PATENT DOCUMENTS

| 2,615,939 | A | * | 10/1952 | Mitchell ........................ 310/247 |
|---|---|---|---|---|
| 2,802,960 | A | * | 8/1957 | Baker ............................. 310/246 |
| 4,843,274 | A | * | 6/1989 | Paisley ........................... 310/239 |
| 5,081,386 | A | * | 1/1992 | Iwai ................................. 310/87 |
| 5,714,826 | A | * | 2/1998 | Furukawa et al. ............. 310/251 |
| 5,723,932 | A | | 3/1998 | Ito et al. |
| 6,541,883 | B2 | | 4/2003 | Uffelman |
| 6,877,373 | B2 | | 4/2005 | Gilmour et al. |
| 7,089,918 | B2 | | 8/2006 | Gilmour et al. |
| 7,467,549 | B2 | | 12/2008 | Forgue |
| 7,527,042 | B2 | | 5/2009 | Crary |
| 7,793,539 | B2 | | 9/2010 | Forgue |
| 7,874,818 | B2 | | 1/2011 | Gottschalk et al. |
| 2007/0013260 | A1 | | 1/2007 | Muramatsu et al. |

FOREIGN PATENT DOCUMENTS

DE 19623854 A1 12/1996

OTHER PUBLICATIONS

Extended European Search Report for EP Application No. 12181380.2 dated Jun. 25, 2014 (8 pages).

* cited by examiner

*Primary Examiner* — Dang Le
(74) *Attorney, Agent, or Firm* — Reising Ethington P.C.

(57) ABSTRACT

In one implementation, a liquid pump includes a pumping element, an electric motor and a brush housing. The electric motor is coupled to the pumping element to drive the pumping element for rotation, and the motor has a commutator, brushes engaged with the commutator to provide electricity to the commutator and at least one biasing member yieldably biasing the brushes into engagement with the commutator. The brush housing defines brush cavities in which the brushes are received, where the brushes have a first surface engaged with the commutator and a second surface spaced from the first surface and acted upon by said at least one biasing member. The second surface is inclined at an acute included angle relative to the first surface.

11 Claims, 2 Drawing Sheets

ELECTRIC MOTOR DRIVEN LIQUID PUMP AND BRUSH FOR SAME

This application claims the benefit of U.S. Provisional Application No. 61/526,416 filed Aug. 23, 2011, which is incorporated herein by reference in its entirety.

TECHNICAL FIELD

The present disclosure relates generally to a liquid pump, such as may be used to pump fuel from a fuel tank, and a brush for an electric motor of the liquid pump.

BACKGROUND

A liquid pump, such as may be used to pump fuel from a vehicle fuel tank, may include a pumping element (e.g. gear, gear rotors, impeller or other) that is driven by an electric motor. The motor may include a commutator and brushes that interface with the commutator to transfer electrical power in the motor. One end of the brushes engages the commutator and the other end of the brushes may be electrically coupled to power terminals of the motor.

SUMMARY

In one implementation, a liquid pump includes a pumping element, an electric motor and a brush housing. The electric motor is coupled to the pumping element to drive the pumping element for rotation, and the motor has a commutator, brushes engaged with the commutator to provide electricity to the commutator and at least one biasing member yieldably biasing the brushes into engagement with the commutator. The brush housing defines brush cavities in which the brushes are received, where the brushes have a first surface engaged with the commutator and a second surface spaced from the first surface and acted upon by said at least one biasing member. The second surface is inclined at an acute included angle relative to the first surface.

In one implementation, a liquid pump includes a pumping element and an electric motor coupled to the pumping element to drive the pumping element for rotation. The motor has a commutator, brushes engaged with the commutator and at least one biasing member yieldably biasing the brushes into engagement with the commutator. In this implementation, the force of the at least one biasing member on the brushes is not perpendicular to a surface of the brushes that engages the commutator.

A brush for an electric motor may include a first surface adapted for engagement with a commutator and a second surface spaced from and opposite to the first surface. The second surface is adapted for engagement with a biasing member to hold the first surface against the commutator, and is inclined relative to the first surface so that the second surface is not parallel to the first surface.

DETAILED DESCRIPTION OF PRESENTLY PREFERRED EMBODIMENTS

Figure 1:
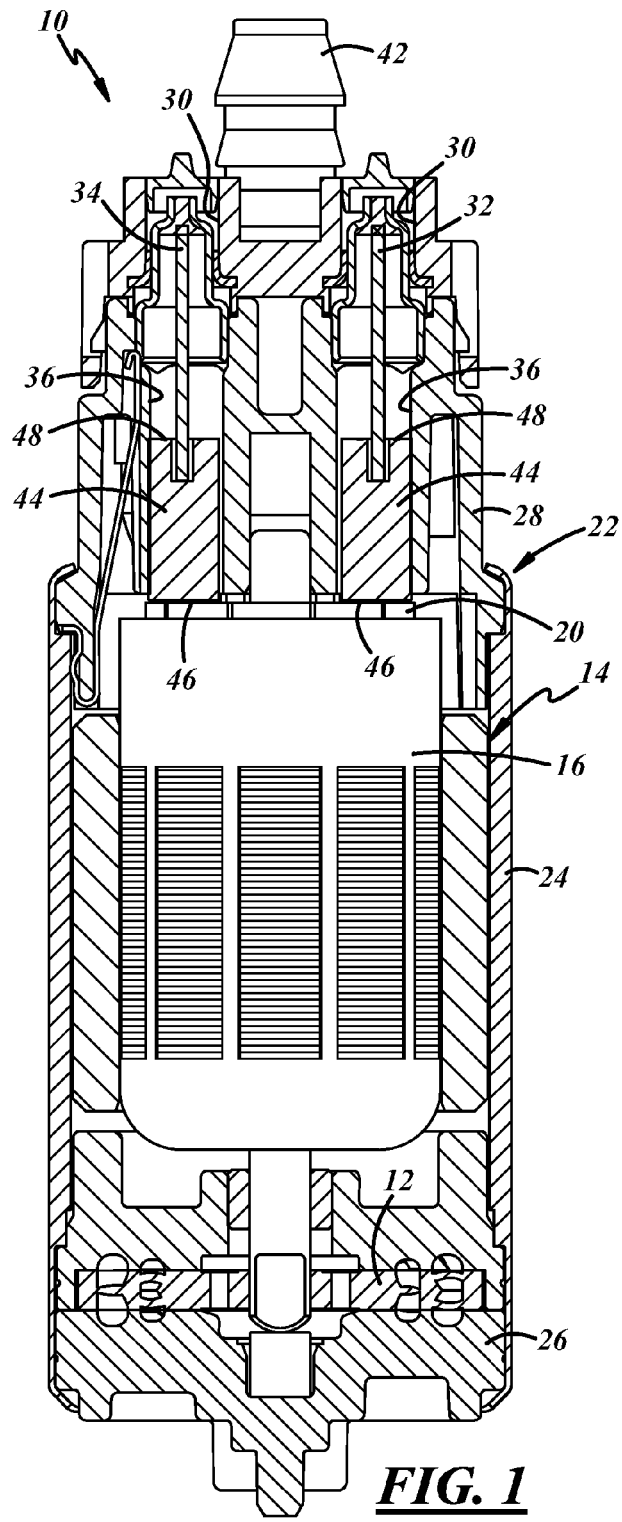
FIG. 1 is a cross sectional view of a liquid pump including an electric motor with brushes and a commutator.

Referring in more detail to the drawings, FIG. 1 illustrates an electric motor driven fluid pump 10, such as may be used to pump fuel from a vehicle fuel tank to a vehicle engine. Of course, other fluids may be pumped. The pump 10 may include a pumping element, such as one or more gears, gear rotors or an impeller 12, by way of examples without limitation. The pumping element 12 is driven by an electric motor 14. The electric motor 14 may include a rotor 16, stator 18 and commutator 20 which may be of conventional construction. The components of the motor 14 and pumping element 12 may be carried by and within a housing 22, which may include a tubular shell 24 (typically formed of metal), a pumping element end cap 26 at one end of the shell, and a motor end cap 28 at the other end of the shell. The pumping element end cap 26 and motor end cap 28 may be formed of plastic or metal, and may be connected to the shell 24 in any suitable way including crimping or rolling the ends of the shell 24 over or about an adjacent end of the end caps 26, 28.

The motor end cap 28 may be located with one end adjacent to the commutator 20 and may include passages 30 for shunt wires 32, 34 and related components that couple to the positive and negative terminals or power wires for the motor 14. Each passage 30 may lead to a separate brush cavity 36 formed in the motor end cap 28, or another component within the housing 22. The brush cavities 36 are open to the commutator 20 at their end opposite to the passages 30. The brush cavities 36 may be of any shape and are shown here as having a narrower first portion 38 (FIGS. 6A and 6B) and a wider second portion 40 (FIGS. 6A and 6B), being generally wedge-shaped in cross-section, and elongated. In the implementation shown, the brush cavities 36 are oriented so that the narrower first portion 38 is positioned radially inwardly of the wider second portion 40. Of course, other arrangements could be used, if desired. The motor end cap 28 may also include other elements, such as a radio frequency interference (RFI), circuit, one or more check valves or vent valves and a fuel outlet 42 through which fuel discharged from the fuel pump 10 is routed.

Figure 2:
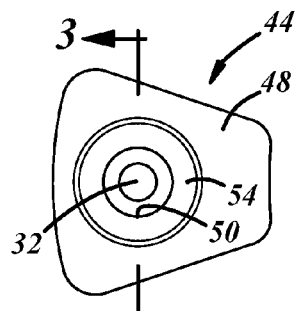
FIG. 2 is a top view of a brush.
Figure 3:
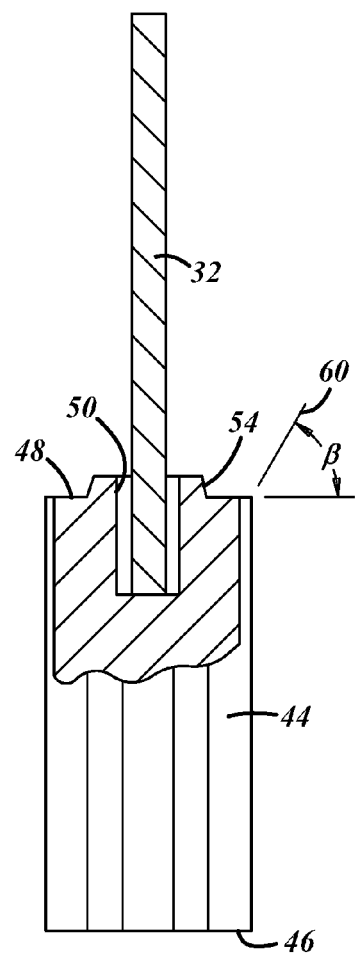
FIG. 3 is a cross sectional view of the brush taken along line 3-3 in FIG. 2.
Figure 4:
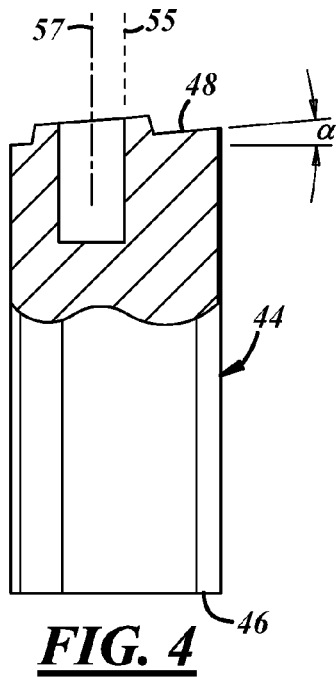
FIG. 4 is a side view of the brush with a portion shown in cross section.
Figure 5:
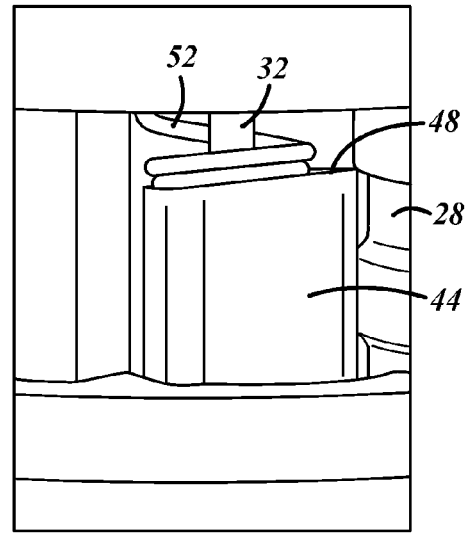
FIG. 5 is an enlarged fragmentary view of a portion of a liquid pump showing a brush and a biasing member acting on a surface of the brush.

A brush 44 may be located within each brush cavity 36. The brushes 44 may be formed of any suitable carbon based material fixed with polymer based binders and may have a first surface 46 adapted to be engaged with the commutator 20 and a second surface 48 spaced from the first surface. The first surface 46 may be generally planar and remain in contact with the commutator 20 in use, as the commutator rotates. The second surface 48 of each brush 44 may each be coupled to a separate shunt wire 32, 34, and a blind bore 50 may be provided in each brush 44 to receive an end of a respective one of the shunt wires 32, 34, as shown in FIGS. 2-4. The shunt wires 32, 34 may in turn be connected to a terminal of the motor (with one shunt wire 32, 34 connected to each of the positive and negative terminals of the motor 14). In this way, electric power for the motor 14 is transferred from the motor terminals through the brushes 44 and to the commutator 20. The second surface 48 of each brush 44 may be engaged by and acted upon by at least one biasing member 52 (FIG. 5), such as a spring, providing a force on each brush 44 to maintain the brushes 44 in contact with the commutator 20. A retaining feature 54, which may be a knob or other feature, may be provided on the second surface 48 to assist in maintaining the biasing member 52 in contact with the second surface 48. As shown in FIG. 4, the second surface 48 of each brush 44, other than the retaining feature 54 may be inclined at an acute included angle α relative to the first surface 46. In at least some forms, the second surface 48 may be inclined at an angle α of between about 2 to 30 degrees relative to the first surface 46. The brushes 44 may be slightly smaller in cross-section than their respective brush cavities 36 providing a gap between at least a portion of each brush 44 and its respective brush cavity 36. The retaining feature 54 may be radially offset from a center 55 of the second surface 48 to bias the biasing member 52 and brush 44 toward the vertex of the angle α. In other words, a center line 57 or axis of the retaining feature 54 may be offset from a centerline 55 or axis of the second surface 48, as generally shown in FIG. 4. The inclined second surface 48 in combination with the radially offset retaining feature 54 may cause the biasing member(s) 52 to yieldably displace the brushes 44 laterally within their brush cavities 36, and into engagement with one or more sidewalls 56 of the brush cavity 36, with a gap between other portions of the brushes 44 and their brush cavities 36. When the inclined second surfaces 48 are provided in a desired orientation, the brushes 44 can be urged into a desired portion of the brush cavities 36.

Figure 6A:
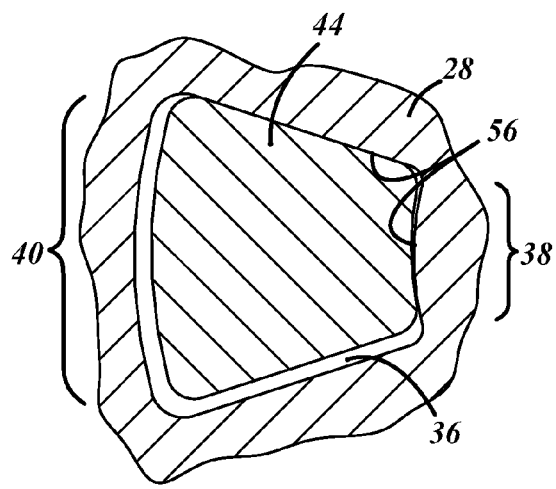
FIGS. 6A and 6B are cross-sectional views showing a brush in two different positions within a brush cavity.
Figure 6B:
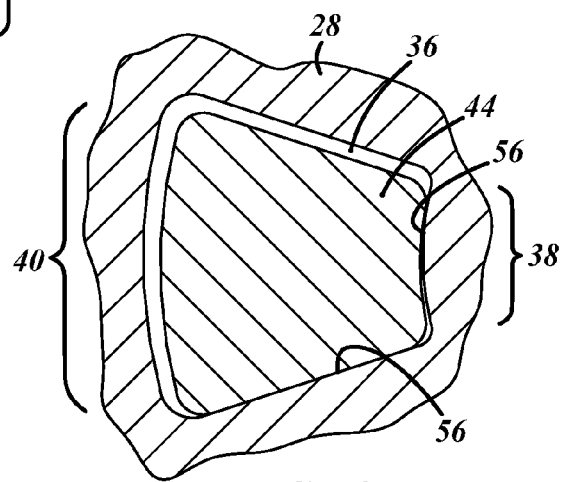

In the implementation shown, the inclined second surface 48 of each brush 44 is oriented so that each brush 44 is urged toward the narrower first portion 38 of its associated brush cavity 36. Because, in the implementation shown, the brush cavities 36 are wedge shaped, displacing the brushes 44 toward the narrower first portion 38 of the brush cavities 36 provides a smaller gap between each brush 44 and the sidewalls 56 defining its brush cavity 36 than if the brushes were displaced toward the wider second portion 40. In this way, the brushes 44 cannot be displaced in use as much as they could be if the brushes 44 were located toward the wider second portion 40 of the brush cavities 36, as generally shown in FIGS. 6A and 6B which show the maximum lateral shifting of the brushes 44 that is permitted when the brushes are moved toward the first portion 38 of the cavities 36. In this manner, the position of the brushes 44 can be better controlled and more consistent from pump to pump within a production run and among different production runs of pumps. This can provide more consistent power transfer within the pump 10, and more consistent motor 14 and fuel pump 10 operation.

Further, in the implementation shown, the second surface 48 is formed from the same material and in one-piece with the rest of each brush 44, but the second surface could be formed from another material and on a second component that is in contact with the rest of the brush 44. The second component could be bonded to the brush, mechanically secured or simply urged into contact with the rest of the brush. Also, while the second surface 48 is shown as having a relatively uniform angle of inclination (that is, the second surface, other than the retaining feature, is shown as being generally planar), the second surface 48 could have a different shape or arrangement. The second surface 48 could be curved, ribbed, stepped, wavy, etc, or shaped in any other way to cause the brush 44 to be consistently positioned within a desired or certain area of the brush cavity 36 in use.

In this form, the force that the springs 52 provide on their respective brushes 44 is uneven on the second surface 48 of each brush 44. That is, the spring force, or a reaction or normal force of the spring force, is offset or angled relative to a line perpendicular to the first surface 46 of the brushes 44 and is perpendicular to the second surface 48 of the brushes 44. This angled spring force tends to displace the brushes 44 within their brush cavities 36, as already described, and may be oriented to displace the brushes 44 toward the narrower first portion 38 of the brush cavities 36, or to any other desired position or location.

In another form, the biasing member(s) 52 could apply a force to the brushes 44 that is not perpendicular to the first surface 46 of the brushes 44. In the example of a coil spring, the spring 52 could be positioned at an angle β offset from a line perpendicular to the first surface 46, as shown by the line 60 in FIG. 3. The offset spring 52 provides a force on the brush 44 that is not perpendicular to the first surface 46 of the brush 44 and tending to displace the brush 44 laterally within its brush cavity 36.

Accordingly, the brushes 44 may be acted upon by a spring force that is not perpendicular to the first surface 46 of the brushes 44. This may be done by angling either a surface of the brushes 44 acted upon by a biasing member(s) 52, by angling the biasing member(s) 52 relative to the brushes 44, or both.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A liquid pump, comprising:
   a pumping element;
   an electric motor coupled to the pumping element to drive the pumping element for rotation, the motor having a substantially flat commutator, brushes engaged with the commutator to provide electricity to the commutator and at least one biasing member yieldably biasing the brushes into engagement with the commutator;
   a brush housing defining brush cavities in which the brushes are slidably received, where the brushes have a first surface engaged with the commutator and a second surface spaced from the first surface and acted upon by said at least one biasing member, and the second surface is inclined at an acute included angle relative to the first surface; and
   the brushes and brush cavities are generally wedge shaped in cross-section having a narrower first portion and a wider second portion and the second surface is angled so that the brushes move toward the first portion of their respective brush cavities under the force of the biasing member.

2. The pump of claim 1 wherein the brush cavities are oriented so that the first portion of each brush cavity is oriented radially inwardly of the second portion.

3. The pump of claim 1 wherein the second surface is inclined at an angle of between 2 degrees and 30 degrees relative to the first surface.

4. The pump of claim 1 wherein the brushes each include a retaining feature associated with said at least one biasing member and the retaining feature is offset from a center line of its associated brush.

5. The pump of claim 1 wherein a surface of the brushes that is engaged by the at least one biasing member is not parallel to the surface of the brushes that engages the commutator.

6. The pump of claim 1 wherein the brushes each include a retaining feature associated with said at least one biasing member and the retaining features are offset from a center line of the brushes.

7. The pump of claim 1 wherein the at least one biasing member includes a spring and the spring is oriented so that the direction of the force the spring provides onto a brush is not perpendicular to the surface of the brush that engages the commutator.

8. The pump of claim 1 wherein a normal force of the spring force on the brush is not perpendicular to the surface of the brush that engages the commutator.

9. The pump of claim 1 wherein the second surface is formed from the same material and in one-piece with the rest of the brush.

10. The pump of claim 1 which also includes a retaining feature provided on the second surface and adapted to engage a biasing member.

11. The pump of claim 10 wherein the retaining feature is offset from a center line of the brush.

* * * * *